United States Patent
Matsumoto

(10) Patent No.: US 10,757,314 B2
(45) Date of Patent: Aug. 25, 2020

(54) IMAGING CONTROL SYSTEM, IMAGING CONTROL METHOD, PROGRAM, AND RECORDING MEDIUM FOR CONTROLLING OPERATION OF DIGITAL IMAGING DEVICE

(71) Applicant: FUJIFILM Corporation, Tokyo (JP)

(72) Inventor: Tetsuya Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/217,516

(22) Filed: Dec. 12, 2018

(65) Prior Publication Data

US 2019/0199908 A1  Jun. 27, 2019

(30) Foreign Application Priority Data

Dec. 27, 2017 (JP) ................. 2017-251113

(51) Int. Cl.
| | |
|---|---|
| H04N 5/232 | (2006.01) |
| H04N 5/247 | (2006.01) |
| G10L 15/22 | (2006.01) |
| H04N 5/217 | (2011.01) |
| G10L 17/00 | (2013.01) |

(52) U.S. Cl.
CPC ......... *H04N 5/23203* (2013.01); *G10L 15/22* (2013.01); *H04N 5/2173* (2013.01); *H04N 5/247* (2013.01); *G10L 17/00* (2013.01); *G10L 2015/223* (2013.01)

(58) Field of Classification Search
CPC .. H04N 5/23203; H04N 5/2173; H04N 5/247; G10L 15/22; G10L 17/00; G10L 2015/223

USPC ......................................................... 382/118
See application file for complete search history.

(56) References Cited

U.S. PATENT DOCUMENTS

| | | | |
|---|---|---|---|
| 7,561,285 B2 * | 7/2009 | Fujinaga ................ | G06K 15/00 358/1.14 |
| 7,751,592 B1 | 7/2010 | Rosenberg et al. | |
| 7,827,412 B2 * | 11/2010 | Matsumoto ........... | G06F 16/972 713/186 |
| 2012/0250953 A1 * | 10/2012 | Nakano ............... | G06K 9/00221 382/118 |

(Continued)

FOREIGN PATENT DOCUMENTS

| | | |
|---|---|---|
| JP | 2006-186938 A | 7/2006 |
| JP | 2007-282100 A | 10/2007 |

*Primary Examiner* — Padma Haliyur

(74) *Attorney, Agent, or Firm* — Studebaker & Brackett PC

(57) ABSTRACT

Provided is a technique for preventing a user of a digital imaging device to capture an inappropriate image and urging the user to capture an appropriate image.
In an imaging control system, an imaging control method, a program, and a recording medium, operation control information including an evaluation item of an image and control content relating to an evaluation result with respect to the evaluation item of the image is acquired in an operation control device, images captured by the plurality of digital imaging devices are analyzed, each image is evaluated with respect to the evaluation item on the basis of the analysis result of the image, and an operation of each of the digital imaging devices is controlled in accordance with control content relating to the evaluation result of the image with respect to the evaluation item.

20 Claims, 3 Drawing Sheets

(56) References Cited

U.S. PATENT DOCUMENTS

| | | | |
|---|---|---|---|
| 2013/0104080 A1* | 4/2013 | Bosworth | G06Q 10/10 |
| | | | 715/838 |
| 2015/0116471 A1* | 4/2015 | Chang | G06K 9/00248 |
| | | | 348/77 |
| 2016/0241766 A1* | 8/2016 | Bender | H04N 5/232 |
| 2016/0323643 A1* | 11/2016 | Panchaksharaiah | ........ |
| | | | H04N 21/44016 |
| 2016/0350675 A1 | 12/2016 | Laks et al. | |

\* cited by examiner

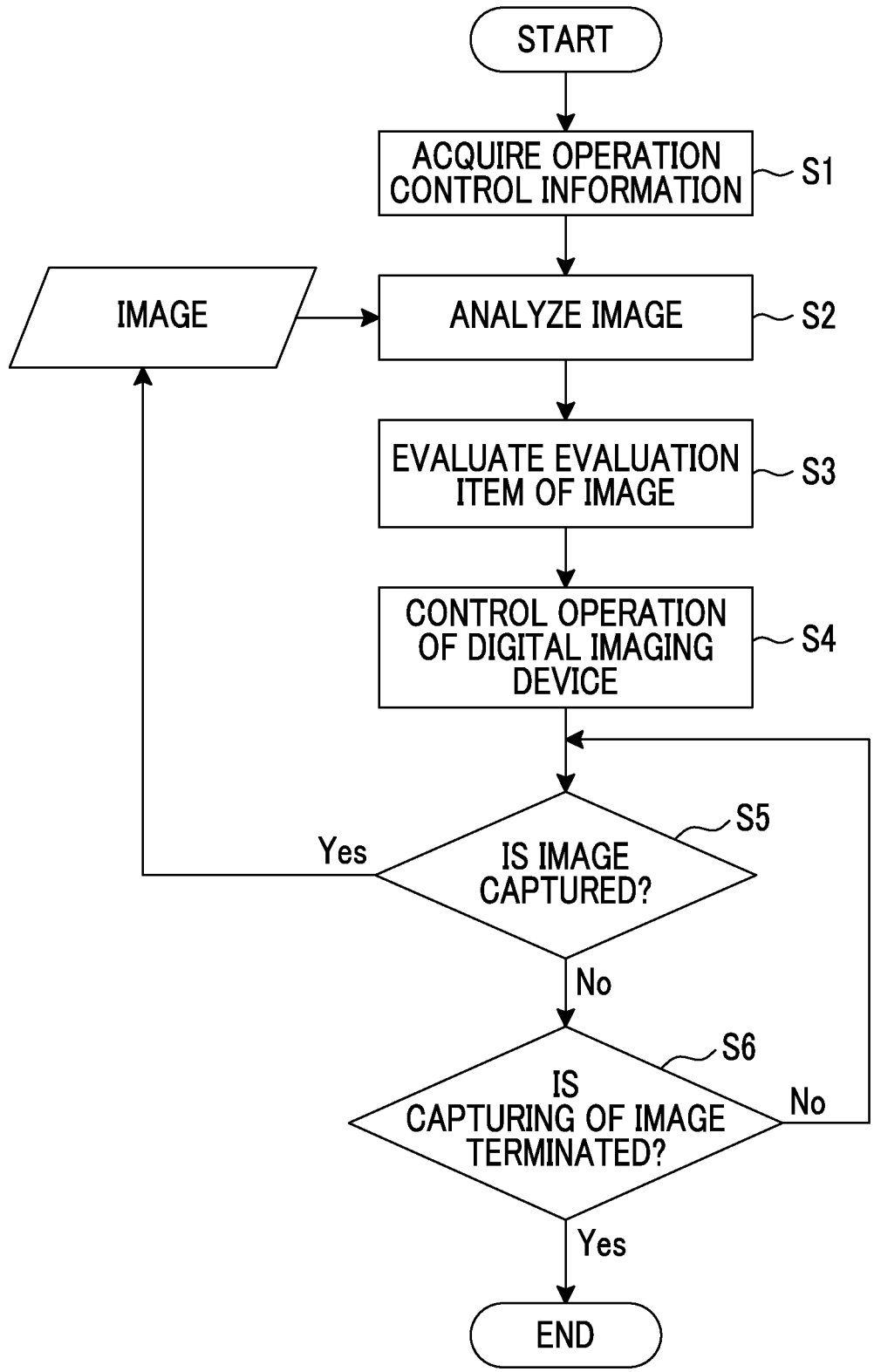

IMAGING CONTROL SYSTEM, IMAGING CONTROL METHOD, PROGRAM, AND RECORDING MEDIUM FOR CONTROLLING OPERATION OF DIGITAL IMAGING DEVICE

CROSS-REFERENCE TO RELATED APPLICATIONS

The present application claims priority under 35 U.S.C. § 119 to Japanese Patent Application No. 2017-251113, filed on Dec. 27, 2017. The above application is hereby expressly incorporated by reference, in its entirety, into the present application.

BACKGROUND OF THE INVENTION

1. Field of the Invention

The present invention relates to an imaging control system, an imaging control method, a program, and a recording medium for controlling an operation of each of a plurality of imaging devices on the basis of images that are respectively captured by the plurality of imaging devices.

2. Description of the Related Art

A digital imaging device such as a digital camera or a smartphone with a camera function has been widely used. On the other hand, in a school event such as a school excursion, an analog imaging device such as a one-time use camera has been utilized.

A first reason for using such an analog imaging device is as follows. That is, in a case where carriage of digital imaging devices is allowed, there is a concern that students who carry digital imaging devices may compete for digital imaging devices of expensive prices or may lose the expensive digital imaging devices. Thus, carrying such digital imaging devices is prohibited, and distribution or carriage of relatively cheap one-time use cameras is allowed.

A second reason is as follows. That is, in a case where digital imaging devices are used, there is a concern that students may capture inappropriate images such as an image showing a student being bullied or may use the captured images without permission to upload the images on a social networking service (SNS) or the like. In order to prevent these problems, such an analog imaging device has been obstinately used.

In a case where analog imaging devices are used, students cannot check captured images on the site, and the captured images are all collected so that a teacher can check content of the images. For example, the captured images may be transmitted to a server, and may be automatically or manually analyzed in the server. Then, synthetic images of a photo album (a photo book) or the like may be created using only appropriate images, may be on sale.

Here, as related art documents relating to the invention, there are JP2006-186938A, JP2007-282100A, U.S. Pat. No. 7,751,592B, and US2016/0350675A.

SUMMARY OF THE INVENTION

In a case where analog imaging devices are used, as described above, there are disadvantages in a digital imaging device in terms of convenience in that students cannot check captured images on the site and there is a limitation in the number of shots (about maximum 39 sheets).

On the other hand, in a case where the digital imaging devices can be operated in a similar way to the analog imaging devices, it is possible to prevent capturing of inappropriate images, and to enhance convenience.

An object of the invention is to provide an imaging control system, an imaging control method, a program, and a recording medium capable of preventing a user of a digital imaging device from capturing an inappropriate image and urging the user to capture an appropriate image.

In order to achieve the object, according to an aspect of the invention, there is provided an imaging control system that includes a plurality of digital imaging devices, and one or more operation control devices that control operations of the plurality of digital imaging devices, comprising: a control information acquisition section that acquires operation control information including an evaluation item of an image and control content relating to an evaluation result with respect to the evaluation item of the image, in the one or more operation control devices; an image analysis section that analyzes images captured by the plurality of digital imaging devices; an image evaluation section that evaluates the image captured by each of the plurality of digital imaging devices with respect to the evaluation item, on the basis of an analysis result of the image; and an operation controller that controls an operation of each of the digital imaging devices in accordance with control content relating to an evaluation result with respect to the evaluation item of the image captured by each of the plurality of digital imaging devices.

Here, it is preferable that the control content includes at least one of image processing with respect to an image or a function control with respect to the digital imaging device.

Further, it is preferable that the imaging control system further comprises a data transmitting/receiving section that transmits and receives data, in which the image evaluation section evaluates the image captured by each of the digital imaging devices with respect to the evaluation item and assigns a score to the image, and the operation controller performs a control so that an image of which the score of the evaluation result is smaller than a threshold value is transmitted from each of the digital imaging devices to the one or more operation control devices through the data transmitting/receiving section.

Further, it is preferable that the imaging control system further comprises a data transmitting/receiving section that transmits and receives data, in which the data transmitting/receiving section transmits all the images captured by the plurality of digital imaging devices to the one or more operation control devices, the image analysis section analyzes the images received from the plurality of digital imaging devices in the one or more operation control devices, and the image evaluation section evaluates the image received from each of the digital imaging devices with respect to the evaluation item, in the one or more operation control devices.

Further, it is preferable that the image analysis section performs subject detection for detecting a subject taken in an image, and the operation controller performs a control so that an image in which a subject that should not be publicly opened is taken and an image in which a subject that should not be taken is taken cannot be used, irrelevant to the control content.

Further, it is preferable that the evaluation item includes detection of a specific person taken in an image, and the control content includes a method for handling the image in which the specific person is taken, the image analysis section performs person detection for detecting the specific person taken in the image, and the operation controller performs a control so that at least one of a process of preventing the image in which the specific person is taken from being taken out from a recording medium of the digital imaging device, a process of deleting the image in which the specific person is taken after displaying the image in which the specific person is taken on an image display section included in the digital imaging device, and a process of applying blurriness to a face of the specific person in a state where the image in which the specific person is taken is recorded on the recording medium, is performed.

Further, it is preferable that the image evaluation section evaluates the image captured by each of the digital imaging devices with respect to the evaluation item and assigns a score to the image, and the operation controller performs a control so that an image of which the score of the evaluation result with respect to the evaluation item is smaller than a threshold value cannot be used in each of the digital imaging devices.

Further, it is preferable that the image analysis section performs at least one of detection of a person's expression taken in an image, detection of a person's situation therein, or detection of a person's skin exposure level therein, the image evaluation section assigns a score to the image so that the score of the image becomes lower in a case where the person's expression is a crying face compared with a case where the person's expression is a smiling face, the score of the image becomes lower in a case where the person's situation is surrounded by a plurality of persons compared with a case where the person's situation is one person, and the score of the image becomes lower in a case where the person's skin exposure level is equal to or larger than a threshold value compared with a case where the person's skin exposure level is smaller than the threshold value, and the operation controller performs a control so that the image of which the score of the image is smaller than the threshold value cannot be used.

Further, it is preferable that the image analysis section analyzes image position information, and the operation controller performs a control so that an image taken at a photographing prohibited location cannot be used on the basis of the image position information.

Further, it is preferable that the image is a motion picture, the imaging control system further comprises a voice recognition section that recognizes a person's voice, and the operation controller performs a control so that the motion picture cannot be used in a case where it is recognized that a word indicating that a person taken in the motion picture does not want to be imaged is included in the voice, by the voice recognition section.

Further, it is preferable that the evaluation item includes detection of a specific subject included in an image to be captured by each of the digital imaging devices, and the control content includes a method for handling the image including the specific subject, the image analysis section performs subject detection for detecting the specific subject included in the image to be captured by each of the digital imaging devices, in each of the digital imaging devices, and the operation controller performs a control so that in a case where the specific subject is included in the image to be captured by each of the digital imaging devices, a warning message indicating that the image in which the specific subject is taken should not be captured is displayed on an image display section included in each of the digital imaging devices, in each of the digital imaging devices.

Further, it is preferable that the specific subject is a specific person, and the operation controller performs a control so that in a case where the specific person is included in an image to be captured by each of the digital imaging devices, a warning message indicating that an image in which the specific person is taken should not be captured is displayed in a face frame that surrounds a face of the specific person displayed on the image display section included in each of the digital imaging devices, in each of the digital imaging devices.

Further, it is preferable that the operation controller performs a control so that blurriness is applied to the specific subject taken in an image captured by ignoring the warning message or the specific subject is deleted from the image captured by ignoring the warning message.

Further, it is preferable that the operation controller performs a control so that capturing of an image in each of the digital imaging devices is locked for a period of time during which the warning message is displayed.

Further, it is preferable that each of the digital imaging devices includes a voice recognition section that recognizes a person's voice, and the operation controller performs a control so that in a case where it is recognized by the voice recognition section that a word indicating that a person does not want to be imaged is included in the voice, a capturing of an image in each of the digital imaging devices is locked.

Further, it is preferable that the imaging control system further comprises a voice registration section that registers a person's voice, in which each of the digital imaging devices includes a voice recognition section that recognizes a person's voice, and the operation controller performs a control so that in a case where a person's voice that matches a person's voice registered in the voice registration section is recognized by the voice recognition section, a capturing of an image in each of the digital imaging devices can be performed or cannot be performed.

Further, it is preferable that the image analysis section analyzes image position information and time information, and the operation controller performs a control so that a capturing of an image in each of the digital imaging devices can be performed or cannot be performed on the basis of the position information and the time information, in each of the digital imaging devices.

Further, it is preferable that the image analysis section analyzes image position information and time information, and the operation controller performs a control so that a power source of each of the digital imaging devices is turned on or turned off on the basis of the position information and the time information, in each of the digital imaging devices.

Further, it is preferable that the imaging control system further comprises a base/extension unit setting section that sets the one or more operation control devices as base units, and sets the plurality of digital imaging devices as extension units, in which the operation controller performs a control so that an image can be captured only in a case where the extension units are allowed to perform imaging from the base units.

Further, it is preferable that the imaging control system further comprises a data transmitting/receiving section that transmits and receives data, in which the data transmitting/receiving section transmits imaging information on the images captured by the plurality of digital imaging devices to the one or more operation control devices.

Further, it is preferable that the imaging control system further comprises a data transmitting/receiving section that transmits and receives data, in which the data transmitting/receiving section transmits an image captured by one digital imaging device among the plurality of digital imaging devices to all the digital imaging devices other than the one digital imaging device.

Further, it is preferable that the imaging control system further comprises a user registration section that registers information on a plurality of users who respectively use the plurality of digital imaging devices; and a user authentication section that authenticates each of the plurality of users on the basis of the information on the plurality of users, in which the operation controller performs a control so that an image can be captured only by a digital imaging device of a user authenticated by the user authentication section.

According to another aspect of the invention, there is provided an imaging control method in an imaging control system that includes a plurality of digital imaging devices and one or more operation control devices that control operations of the plurality of digital imaging devices, comprising: acquiring operation control information including control content relating to an evaluation item of an image and an evaluation result with respect to the evaluation item of the image, in the one or more operation control devices, in a control information acquisition section; analyzing images captured by the plurality of digital imaging devices, in an image analysis section; evaluating the image captured by each of the plurality of digital imaging devices with respect to the evaluation item, on the basis of an analysis result of the image, in an image evaluation section; and controlling an operation of each of the digital imaging devices in accordance with control content relating to an evaluation result with respect to an evaluation item of the image captured by each of the plurality of digital imaging devices, in an operation controller.

According to still another aspect of the invention, there is provided a program for causing a computer to execute the respective steps of the imaging control method.

According to still another aspect of the invention, there is provided a non-transitory computer-readable recording medium having a program for causing a computer to execute the respective steps of the imaging control method recorded thereon.

According to still another aspect of the invention, there is provided an imaging control system that includes a plurality of digital imaging devices, and one or more operation control devices that control operations of the plurality of digital imaging devices, comprising: a control information acquisition section that acquires operation control information including an evaluation item of an image and control content relating to an evaluation result of the image with respect to the evaluation item, in the one or more operation control devices; an image analysis section that analyzes images captured by the plurality of digital imaging devices; an image evaluation section that evaluates the image captured by each of the plurality of digital imaging devices with respect to the evaluation item, on the basis of an analysis result of the image; and an operation controller that controls an operation of each of the digital imaging devices in accordance with control content relating to an evaluation result with respect to the evaluation item of the image captured by each of the plurality of digital imaging devices, in which the image analysis section, the image evaluation section, and the operation controller are configured by hardware, or by a processor that executes a program.

According to the invention, it is possible for a user of an operation control device to create imaging control information. Further, in a case where an inappropriate image against the operation control information indicating an intention of the user of the operation control device is captured by a digital imaging device, it is possible to rapidly control an operation of the digital imaging device. Accordingly, it is possible to prevent a user of the digital imaging device from capturing an inappropriate image in advance. Further, it is possible to urge the user to capture an appropriate image to obtain abundant photographing experiences.

BRIEF DESCRIPTION OF THE DRAWINGS

FIG. 3 is a flowchart showing an operation of the imaging control system.

DESCRIPTION OF THE PREFERRED EMBODIMENTS

Hereinafter, an imaging control system, an imaging control method, a program, and a recording medium of the invention will be described in detail on the basis of a preferred embodiment shown in the accompanying drawings.

Figure 1:
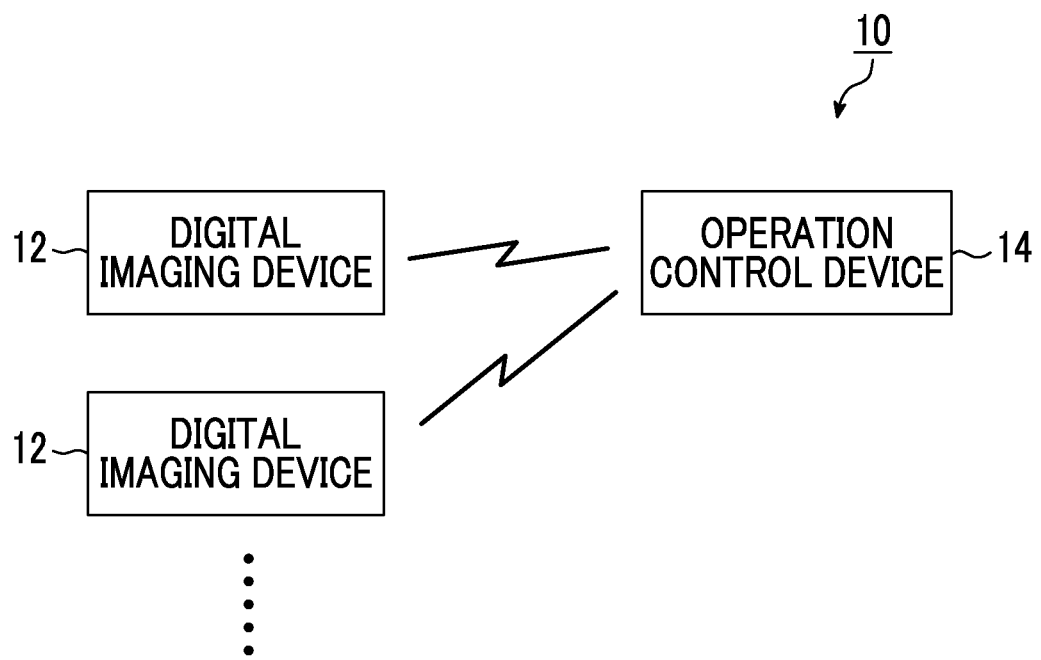
FIG. 1 is a block diagram showing a configuration of an imaging control system according to an embodiment of the invention.

FIG. 1 is a block diagram showing a configuration of an imaging control system according to an embodiment of the invention. An imaging control system 10 shown in FIG. 1 includes a plurality of digital imaging devices 12 and an operation control device 14 that controls operations of the plurality of digital imaging devices 12. The imaging control system 10 controls an operation of each of the digital imaging devices 12 on the basis of images that are respectively captured by the plurality of digital imaging devices 12.

In a case where the imaging control system 10 is used in a school event such as a school excursion, for example, users of the digital imaging devices 12 are students, and a user of the operation control device 14 is a teacher. Each user is not limited to one person, and may be plural persons included in a group. Further, the imaging control system 10 may include one operation control device 14, or two or more operation control devices 14. In a case where two or more operation control devices 14 are provided, for example, two or more teachers use the two or more operation control devices 14, respectively.

The digital imaging device 12 is a digital mobile communication terminal having a camera function (an imaging application installed in a smartphone) and a wireless communication function, such as a smartphone. The operation control device 14 is a digital mobile communication terminal such as a smartphone, or a communication device having a wireless communication function, such as a personal computer (PC), a node PC, a tablet PC, or a server. The plurality of digital imaging devices 12 and the operation control device 14 may be connected to each other through wireless communication.

Figure 2:
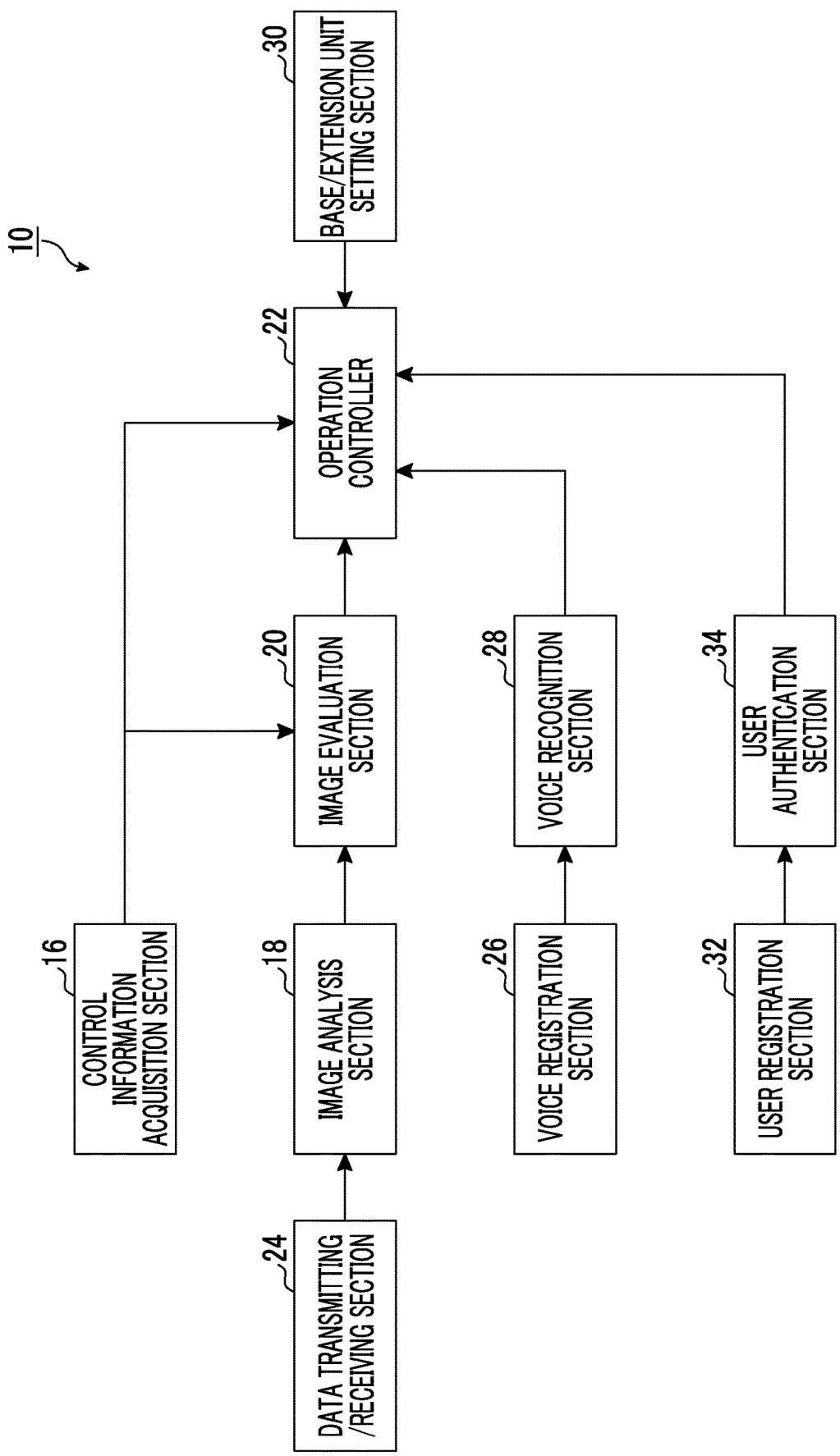
FIG. 2 is a block diagram showing an internal configuration of the imaging control system according to the embodiment of the invention.

FIG. 2 is a block diagram showing an internal configuration of the imaging control system according to the embodiment of the invention. The imaging control system 10 includes therein a control information acquisition section 16, an image analysis section 18, an image evaluation section 20, an operation controller 22, a data transmitting/receiving section 24, a voice registration section 26, a voice recognition section 28, a base/extension unit setting section 30, a user registration section 32, and a user authentication section 34, as shown in FIG. 2.

Each digital imaging device 12 at least includes the operation controller 22, the data transmitting/receiving section 24, the voice recognition section 28, and the user authentication section 34, and the operation control device 14 at least includes the control information acquisition section 16 and the data transmitting/receiving section 24. The image analysis section 18, the image evaluation section 20, the voice registration section 26, and the base/extension unit setting section 30, and the user registration section 32 may be provided in each digital imaging device 12, or may be provided in the operation control device 14.

The control information acquisition section 16 acquires operation control information including an image evaluation item and control content relating to an evaluation result with respect to the image evaluation item, in the operation control device 14.

The control information acquisition section 16 is an interface circuit that acquires operation control information.

A method for acquiring the operation control information in the operation control device 14 is not particularly limited, but for example, operation control information selected by a user of the operation control device 14 may be acquired from a list of plural pieces of operation control information that is created in advance. Alternatively, operation control information that is input by manually operating a graphical user interface (GUI) provided by the operation control device 14 from each user may be acquired.

The evaluation item is an item that is an evaluation target for evaluating whether an image captured by a user of the digital imaging device 12 is an appropriate image or an inappropriate image by a user of the operation control device 14, and is not particularly limited, but includes detection of a person's expression (whether the person has a smiling face, a crying face, or the like), detection of a person's situation (whether the person is included in a group, or the like), detection of a skin exposure level, detection of a specific subject, or the like. The subject includes a person and an object other than the person.

Further, the control content includes at least one of image processing with respect to an image or a function control with respect to the digital imaging device 12. The image processing includes a handling method of an image in which a specific subject is taken, for example, and the image handling method includes usability of an image, an opening range of the image, possibility of printing, possibility of downloading, and the like. The function control includes a control of possibility of imaging using the digital imaging device 12, a control of power on/off of the digital imaging device 12, and the like.

Subsequently, the image analysis section 18 analyzes the images captured by the plurality of digital imaging devices 12.

An analysis item of image analysis is not particularly limited, but includes analysis of image content such as subject detection (person detection and object detection) for detecting a subject taken in an image, person's face detection/face recognition, person's expression detection, person's situation detection, and person's skin exposure level detection, analysis of image quality of an image such as a brightness of an image, a tint, a contrast, or a level of a picture blur, analysis of time information (imaging date and time), position information (imaging location), and the like that are included in additional image information such as an exchangeable image file format (Exit), and the like.

Further, the image analysis section 18 may perform person classification for classifying a plurality of images into image groups of respective persons on the basis of an analysis result of the face detection/face recognition, object classification for classifying a plurality of images into image groups of respective objects on the basis of an analysis result of the object detection, date and time information classification for classifying a plurality of images into image groups of respective imaging dates and times on the basis of the time information, position information classification for classifying a plurality of images into image groups of imaging locations on the basis of the position information, and the like.

In a case where the evaluation item is the person's expression detection, the image analysis section 18 performs the person detection, the person's face detection/face recognition, the person's expression detection, and the like. Further, in a case where the evaluation item is the person's situation detection, the image analysis section 18 performs the person detection, the person's situation detection, and the like. In a case where the evaluation item is the person's skin exposure level detection, the image analysis section 18 performs the person detection, the person's skin exposure level detection, and the like. In a case where the evaluation item is a specific person's detection, the image analysis section 18 performs the person detection, the person's face detection/face recognition, and the like, and detects whether the person is the specific person by comparing a detected face image with a face image of the specific person that is registered in advance.

The item analysis may be performed through pattern recognition, or may be performed using a learning-completed model obtained by performing learning using a neural network.

Subsequently, the image evaluation section 20 evaluates the image captured by each of the plurality of digital imaging devices 12 with respect to the evaluation item, on the basis of an analysis result of the image in the image analysis section 18.

In a case where the evaluation item is the person's expression detection, for example, in the case of an image in which a person who has a crying face is taken on the basis of the analysis result of the person's expression detection, since there is a high possibility that the image is an image in which a person who is being bullied is taken, the image evaluation section 20 evaluates that the image is an inappropriate image, and assigns a low evaluation compared with the case of an image in which a person who has a normal expression is taken. On the other hand, in the case of an image in which a person who has a smiling face is taken, the image evaluation section 20 evaluates that the image is an appropriate image, and assigns a high evaluation compared with the case of the image in which the person who has the normal expression is taken.

The inappropriate image refers to an image for which evaluation with respect to an evaluation item is lower than evaluation for an appropriate image with respect to the evaluation item. A threshold value for determining the inappropriate image and the appropriate image may be freely set by a user of the operation control device 14.

Further, the image evaluation section 20 may evaluate an image captured by each of the digital imaging devices 12 with respect to an evaluation item and assigns a score to the image, on the basis of an analysis result of the image in the image analysis section 18.

The image evaluation section 20 assigns scores so that as a possibility that an image is an inappropriate image becomes higher, a score of an evaluation result of the image with respect to an evaluation item becomes lower, for example.

For example, in a case where the evaluation item is the person' expression detection, in the case of an image in which a crying face is taken on the basis of an analysis result of the person's expression detection, the image evaluation section 20 lowers a score of analysis of the image with respect to the person's expression detection, that is, a score of an evaluation item, compared with the case of an image in which a person who has a normal expression is taken. On the other hand, in the case of an image in which a person who has a smiling face is taken, the image evaluation section 20 increases a score of the image with respect to an evaluation item, compared with the case of the image in which the person who has the normal expression is taken.

The image evaluation section 20 may calculate a score of an evaluation result of each image with respect to an evaluation item by adding up scores of analysis results of one or more analysis items, instead of using only the score of the evaluation result with respect to the evaluation item.

Subsequently, the operation controller 22 controls the operation of each digital imaging device 12 in accordance with the control content relating to the evaluation result with respect to the evaluation item, of the image captured by each digital imaging devices 12.

The operation controller 22 performs at least one of image processing with respect to an image or a function control with respect to the digital imaging device 12, as the control of the operation of the digital imaging device 12 in accordance with the control content relating to the evaluation result with respect to the image evaluation item.

The operation controller 22 performs a control so that an image cannot be used, or performs a control so that the image is deleted, for example, as the image processing with respect to the image. Further, the operation controller 22 performs a control so that an image can be captured or cannot be captured by each digital imaging device 12, or performs a control so that a power source of each digital imaging device 12 is turned on or turned off, for example, as the function control with respect to the digital imaging device 12.

Further, the operation controller 22 may control the operation of each digital imaging device 12 in accordance with the control content relating to the score of the evaluation result with respect to the evaluation item, of the image captured by each digital imaging device 12.

The operation controller 22 may perform a control so that an image of which the score of the evaluation result with respect to the evaluation item is smaller than a threshold value cannot be used, as the image processing with respect to the image.

Subsequently, the data transmitting/receiving section 24 transmits and receives data.

The data transmitting/receiving section 24 is a data communication circuit that transmits and receives data through wired communication or wireless communication.

The data transmitting/receiving section 24 transmits and receives imaging information such as an image captured by each digital imaging device 12, an imaging location, an imaging time, a subject taken in the image, or a photographer of the image, as data. Further, the data transmitting/receiving section 24 may transmit and receive data between each digital imaging device 12 and the operation control device 14, or may transmit and receive data between the respective digital imaging devices 12.

Subsequently, the voice registration section 26 registers a person's voice.

The voice registration section 26 is a memory circuit that registers a person's voice.

The voice registration section 26 records and registers a voice of a user of each digital imaging device 12 before use of the imaging control system 10 is started, for example.

Then, the voice recognition section 28 recognizes a person's voice.

In a case where a person is to be imaged, for example, the voice recognition section 28 recognizes whether a voice of the person matches a voice of a person registered in the voice registration section 26, or recognizes whether a word indicating that the person does not want to be imaged is included in the voice.

Subsequently, the base/extension unit setting section 30 sets the operation control device 14 as a base unit, and sets the plurality of digital imaging devices 12 as extension units.

For example, in the case of a school event, the base/extension unit setting section 30 sets the operation control device 14 used by a teacher as a base unit, and sets the digital imaging devices 12 to be used by students as extension units on the basis of settings of a base unit and extension units input by users such as a teacher and students.

Subsequently, the user registration section 32 registers information on a plurality of users who respectively use the plurality of digital imaging devices 12.

The user registration section 32 is a memory circuit that registers information on users.

The information on the users represents information for uniquely identifying the plurality of users, which is not particularly limited, but may include a face image, a fingerprint, a combination of an identifier and a password, or the like of each user.

Subsequently, the user authentication section 34 authenticates each of the plurality of users on the basis of the information on the plurality of users registered in the user registration section 32.

In a case where the information on the users corresponds face images, for example, the user authentication section 34 captures a face image of the user of each digital imaging device 12 using a camera function of the digital imaging device 12, and compares the captured face image of the user with a face image of each of the plurality of users registered in the user registration section 32 in advance. In a case where both of the face images match each other, the user authentication section 34 authenticates that the user is a right user of the digital imaging device 12. This is similarly applied to the case of the fingerprint, the combination of the identifier and the password, and the like.

Next, an operation of the imaging control system 10 will be described with reference to a flowchart of FIG. 3.

In a case where the imaging control system 10 is used, first, operation control information including an image evaluation item and control content is acquired by the control information acquisition section 16, in the operation control device 14 (step S1).

A user of each digital imaging device 12 captures an image using the digital imaging device 12 of the user.

After the image is captured, the images captured by the plurality of digital imaging devices 12 are analyzed by the image analysis section 18 (step S2).

Subsequently, the images captured by the respective digital imaging devices 12 are evaluated by the image evaluation section 20 with respect to the evaluation item included in the operation control information, on the basis of analysis results of the images (step S3).

Then, the operation of each digital imaging device 12 is controlled by the operation controller 22 in accordance with the control content relating to the evaluation result with respect to the evaluation item, of the image captured by each digital imaging device 12 (step S4).

Subsequently, determination of whether the image is captured by each digital imaging device 12 is performed (step S5).

As a result, in a case where the image is captured (Yes in step S5), the procedure returns to step S2, and then, the above-described operations are repeated.

On the other hand, in a case where the image is not captured (No in step S5), determination of whether the capturing of the image is terminated is performed (step S6).

As a result, in a case where the capturing of the image is not terminated (No in step S6), the procedure returns to step S5, and then, the above-described operations are repeated.

On the other hand, in a case where the capturing of the image is terminated (Yes in step S6), the procedure is terminated.

In the related art, in an event or the like, in a case where an analog imaging device such as an one-time use camera is used, either in a case where a captured image is an appropriate image or in a case where the captured image is an inappropriate image, it is not possible to view the image until the image is printed.

On the other hand, in the imaging control system 10, it is possible for a user of the operation control device 14 to create imaging control information, and in a case where an inappropriate image against operation control information indicating user's intention of the operation control device 14 is captured by the digital imaging device 12, it is possible to rapidly control the operation of the digital imaging device 12. Further, in other cases, it is possible to use the digital imaging device 12 as a smartphone, a digital camera, or the like having a normal camera function.

Accordingly, it is possible to prevent a user of the digital imaging device 12 from capturing an inappropriate image in advance. Further, it is possible to urge the user to capture an appropriate image to obtain abundant photographing experiences. Further, it is possible for the user of the operation control device 14 to realize, using an evaluation item considered to be necessary in accordance with content of an event or the like, control content based on an evaluation result of an image with respect to the image evaluation item in the digital imaging device 12.

The image analysis, the image evaluation, and the operation control may be performed whenever an image is captured by each digital imaging device 12, may be performed whenever a predetermined number of images are captured, or may be performed whenever a predetermined time elapses. Further, the operation control may be performed in a direction where the operation of the digital imaging device 12 is limited or in a direction where the limit is released, whenever an image is evaluated with respect to an evaluation item, in accordance with an evaluation result of the image with respect to the evaluation item.

In each digital imaging device 12 or the operation control device 14, it is possible to perform the processes such as the image analysis, the image evaluation, and the like. Alternatively, it is possible to share the processes in both of each digital imaging device 12 and the operation control device 14.

Further, in a case where an image captured by each of the digital imaging devices 12 is evaluated with respect to an evaluation item and is assigned a score by the image evaluation section 20, the operation controller 22 may perform a control so that an image of which the score of the evaluation result with respect to the image evaluation item is smaller than a threshold value is transmitted from each of the digital imaging devices 12 to one or more operation control devices 14 through the data transmitting/receiving section 24. The threshold value may be set by a user of the operation control device 14.

The image of which the score of the evaluation result is smaller than the threshold value is an image having a high possibility that the image is an inappropriate image. Accordingly, by transmitting only the image of which the score of the evaluation result is smaller than the threshold value to the operation control device 14, it is possible for the user of the operation control device 14 to check content of only the image having the high possibility that the image is the inappropriate image, without checking content of all images captured by the plurality of digital imaging devices 12, and thus, it is possible to reduce the burden for checking.

Alternatively, all the images captured by the plurality of digital imaging devices 12 may be transmitted to the operation control device 14 through the data transmitting/receiving section 24. In this case, in the operation control device 14, the images received from the plurality of digital imaging devices 12 are analyzed by the image analysis section 18, and each image received from each digital imaging device 12 is evaluated with respect to an evaluation item by the image evaluation section 20.

In a case where the image analysis and the image evaluation are performed in the operation control device 14, the image analysis may be automatically performed by the image analysis section 18, and the image evaluation may be automatically performed by the image evaluation section 20. Alternatively, the image analysis and the image evaluation may be visually performed by a user of the operation control device 14. Alternatively, as a combination thereof, one of the image analysis and the image evaluation may be automatically performed, and then, the other one may be manually performed.

Further, in a case where the subject detection for detecting a subject taken in an image is performed by the image analysis section 18, the operation controller 22 may perform a control so that an image in which a subject that should not be publicly opened, such as an image of a person who does not want to publically open the face, is taken, and an image in which a subject that should not be taken, such as an image of an art work which is exhibited in an art gallery, is taken cannot be used, irrelevant to control content included in operation control information.

Further, in a case where an evaluation item includes detection of a specific person taken in an image and control content includes a method for handling the image in which the specific person is taken, person detection for detecting the specific person taken in the image is performed by the image analysis section 18.

In this case, the operation controller 22 may perform a control so that at least one of a process of preventing the image in which the specific person detected by the image analysis section 18 is taken from being taken out from the recording medium of the digital imaging device 12, a process of deleting the image in which the specific person is taken after displaying the image in which the specific person is taken on an image display section included in the digital imaging device 12, for example, and a process of applying blurriness to the face of the specific person in a state where the image in which the specific person is taken is recorded on the recording medium, is performed.

Thus, it is possible to prevent the image in which the specific person is taken from being used.

Further, in a case where an image captured by each digital imaging device 12 is evaluated with respect to an evaluation item and is assigned a score by the image evaluation section 20, since there is a high possibility that an image of which the score of the evaluation result is smaller than a threshold value is an inappropriate image as described above, the operation controller 22 may perform a control so that the image of which the score of the evaluation result with respect to the image evaluation item is smaller than the threshold value cannot be used in each of the digital imaging devices 12.

In addition, in a case where at least one of detection of a person's expression taken in an image, detection of a person's situation therein, or detection of a person's skin exposure level therein is performed by the image analysis section 18, a score of an image is assigned so that a lower score is assigned to an image in a case where the person's expression is a crying face compared with a case where the person's expression is a smiling face, a lower score is assigned to an image in a case where the person's situation is surrounded by plural persons compared with a case where the person's situation is one person, and a lower score is assigned to an image in a case where the person's skin exposure level is equal to or larger than a threshold value compared with a case where the person's skin exposure level is smaller than the threshold value, by the image evaluation section 20.

In this case, similarly, the operation controller 22 may perform a control so that the image of which the score of the image is smaller than the threshold value cannot be used.

Further, in a case where image position information is analyzed by the image analysis section 18, the operation controller 22 may perform a control so that an image captured at a photographing prohibited location such as an art gallery or a shrine cannot be used, on the basis of the image position information.

Further, in a case where the image is a motion picture, the operation controller 22 may perform a control so that in a case where it is recognized by the voice recognition section 28 that a word indicating that a person taken in the motion picture does not want to be imaged is included in a voice, the motion picture cannot be used. The word indicating that the person does not want to be imaged is not particularly limited, and for example, may be a keyword such as "stop", or "no", which may be registered in the voice registration section 26.

Further, in a case where the evaluation item includes detection of a specific subject included in an image to be captured by each of the digital imaging devices 12, that is, a captured image before imaging and the control content includes a method for handling the image including the specific subject, subject detection for detecting the specific subject included in the image to be captured by each of the digital imaging devices 12 is performed in each of the digital imaging devices 12, by the image analysis section 18.

In this case, in a case where the specific subject is included in the image to be captured by each of the digital imaging devices 12, the operation controller 22 may perform a control so that a warning message indicating that the image in which the specific subject is taken should not be captured is displayed on the image display section provided in each of the digital imaging devices 12, in each of the digital imaging devices 12.

Thus, it is possible to urge the user of the digital imaging device 12 so as not to capture the image in which the specific subject is taken.

In a case where the specific subject is a specific person, the operation controller 22 may perform a control so that in a case where the specific person is included in the image to be captured by each of the digital imaging devices 12, a warning message indicating that an image in which the specific person is taken should not be captured is displayed in a face frame that surrounds the face of the specific person displayed on the image display section in each of the digital imaging devices 12, in each of the digital imaging devices 12.

Further, the operation controller 22 may perform a control so that a process of applying blurriness to the specific subject taken in an image captured by ignoring the warning message or a process of deleting the specific subject from the image captured by ignoring the warning message through trimming or the like.

Thus, even in a case where an image is captured by ignoring the warning message, it is possible to prevent an image in which a specific subject that should not be taken is taken from being used.

Further, the operation controller 22 may perform a control so that the capturing of the image in each of the digital imaging devices 12 is locked, that is, the capturing of the image cannot be performed during a period of time during which the warning message is displayed.

Thus, it is possible to reliably prevent an image in which a subject that should not be taken from being captured.

Further, in a case where it is recognized by the voice recognition section 28 that a word indicating that a person does not want to be imaged is included in a voice, the operation controller 22 may perform a control so that the capturing of the image in each of the digital imaging devices 12 is locked.

Thus, it is possible to prevent an image in which a person who does not want to be imaged is taken from being captured.

In addition, in a case where a voice of a person that matches a voice of a person registered in the voice registration section 26 is recognized by the voice recognition section 28, the operation controller 22 may perform a control so that the capturing of the image in each of the digital imaging devices 12 can be performed or cannot be performed.

For example, in a case where a voice of a person who does not want to be imaged is recognized, it is possible to perform a control so that the capturing of the image cannot be performed irrespectively of content of the voice. Thus, it is possible to prevent capturing of an image, regardless of a keyword such as "stop" or "no".

In a case where image position information and time information are analyzed by the image analysis section 18, the operation controller 22 may perform a control so that the capturing of the image in each of the digital imaging devices 12 can be performed or cannot be performed on the basis of the position information and the time information, in each of the digital imaging devices 12. Alternatively, the operation controller 22 may perform a control so that a power source of each of the digital imaging devices 12 is turned on or turned off on the basis of the position information and the time information, in each of the digital imaging devices 12.

Further, in a case where the operation control device 14 is set as a base unit and the plurality of digital imaging devices 12 are set as extension units by the base/extension unit setting section 30, the operation controller 22 may perform a control so that an image can be captured only in a case where the extension units are allowed to perform imaging from the base unit, through hand shake between each of the digital imaging devices 12 and the operation control device 14.

Thus, at a location where an image should not be captured, such as an art gallery or a shrine, and during a time span at which a user of the operation control device 14 does not want a user of each digital imaging device 12 to capture an image, it is possible to prevent the capturing of the image from being performed.

Further, imaging information of images captured by the plurality of digital imaging devices 12 may be transmitted to the operation control device 14 through the data transmitting/receiving section 24.

The user of the operation control device 14 may understand that images are captured, for example, at a photographing prohibited location from imaging information on imaging locations, imaging times, subjects taken in images, photographers of the images, and the like. This is similarly applied to other imaging information. Further, in a case where imaging information is transmitted, it is possible to greatly reduce the amount of traffic data compared with a case where images are transmitted.

Further, an image captured by one digital imaging device 12 among the plurality of digital imaging devices 12 may be transmitted to all the other digital imaging devices 12 other than the one digital imaging device 12 through the data transmitting/receiving section 24.

Users of the other digital imaging devices 12 may add a mark such as "Nice!" or "Bad!" to the image captured by one digital imaging device 12, and an image with the mark "Bad!" may be determined as an inappropriate image so as not to be used.

Thus, the user of each of the digital imaging devices 12 may check images captured by digital imaging devices 12 of different users, and may pay attention to prevent inappropriate images from being captured.

In addition, in a case where information on a plurality of users who respectively use the plurality of digital imaging devices 12 is registered by the user registration section 32, each of the plurality of users who uses each of the digital imaging devices 12 is authenticated by the user authentication section 34, using a face image, a fingerprint, a combination of an identifier and a password, or the like of each user, on the basis of the information on the plurality of users registered in the user registration section 32.

In this case, the operation controller 22 may perform a control so that only the digital imaging device 12 of the user authenticated by the user authentication section 34 can capture an image.

Thus, it is possible to prevent the digital imaging device 12 from being used by a person other than an original user.

On the other hand, instead of performing a control so that an inappropriate image cannot be used or performing a control so that an inappropriate image cannot be captured, another method may be used. For example, in a school event such as a school excursion, in a case where students visit Kyoto and take photos of Kiyomizudera, as a first image capturing mission clear, by clearing a plurality of image capturing missions that are set in advance by a user of the operation control device 14 to sequentially capture appropriate images, it is possible to guide the students so as not to capture inappropriate images.

Further, as the digital imaging device 12, a monitorless camera that is not provided with an image display section may be used. In this case, a user of the monitorless camera cannot check an image captured by the monitorless camera on the site. In addition, since the image captured by the monitorless camera is transmitted to the operation control device 14 from the monitorless camera through the data transmitting/receiving section 24 and is checked by the user of the operation control device 14, it is possible to guide the user of the monitorless camera so as not to capture inappropriate images.

Further, in the imaging control system 10, on the basis of evaluation results with respect to an evaluation item, of images captured by the plurality of digital imaging devices 12, it is possible to discriminate whether the captured images are appropriate images or inappropriate images. Accordingly, without performing image analysis or the like again with respect to images determined as appropriate images, it is possible to use the images for synthetic images for a photo album (a photobook) such as a school excursion album and a graduation album, for example, to create the synthetic images.

The imaging control system 10 may be used for various events in which plural persons participate such as an idol event, in addition to a school event, and may be used at various locations where image capturing is limited, such as an art gallery or a shrine.

In the idol event, there is a chance to take a photo of idols. In this case, in order to prevent photos of the idols from being spread on the Internet, SNS, and the like, in many cases, imaging is usually performed using analog cameras that are prepared in advance by a company to which the idols belong.

By using the imaging control system 10 in such an idol event, the company may check all the photos, and thus, it is possible to prevent the photos from being spread on the Internet, SNS, and the like while securing convenience of a digital imaging device.

In the art gallery, the shrine, and the like, there is a case where imaging is limited to protect important works and cultural properties. Here, in a case where imaging conditions (for example, a condition that a flash should not be used) are satisfied, the limit to imaging may be released. Further, there is a case where it is difficult for a manager to permit visitors to randomly capture images of art works in terms of copyright.

By using the imaging control system 10 in the art gallery, the shrine, and the like, all captured images may be transmitted to the operation control device 14, and thus, it is possible for a user of the operation control device 14, that is, the manager of the art gallery, the shine, and the like to check all the captured images without damaging convenience of a digital imaging device.

In the device of the invention, for example, a hardware configuration of processing units that execute various processes of the image analysis section 18, the image evaluation section 20, the operation controller 22, the voice recognition section 28, the base/extension unit setting section 30, the user authentication section 34, and the like may be dedicated hardware, or may be a variety of processors or a computer that executes a program.

The variety of processors include a central processing unit (CPU) that is a general use processor that functions as a variety of processing units by executing software (program), a programmable logic device (PLD) that is a processor capable of changing a circuit configuration after manufacturing, such as a field programmable gate array (FPGA), a dedicated electric circuit that is a processor having a circuit configuration that is dedicatedly designed for performing a specific process, such as an application specific integrated circuit (ASIC), or the like.

One processing unit may be configured by one processor among the variety of processors described above, or may be configured by a combination of the same type or different types of two or more processors, for example, a combination of a plurality of FPGAs, a combination of an FPGA and a CPU, or the like. Further, a plurality of processing units may be configured by one processor among a plurality of processors. Furthermore, two or more processing units among a plurality of processing units may be collectively configured by one processor.

For example, as represented by a computer such as a server or a client, a configuration in which a combination of one or more CPUs and software forms one processor and this processor functions as a plurality of processing units may be employed. In addition, as represented by a system on chip (SoC) or the like, a configuration in which a processor for realizing entire functions of a system including a plurality of processing units using one integrated circuit (IC) chip is used may be employed.

Further, the hardware configuration of the variety of processors is, more specifically, electric circuitry in which circuit elements such as semiconductors are combined.

In addition, the method of the invention may be executed by a program for causing a computer to execute the respective steps. Further, a computer-readable recording medium on which the program is recorded may be also provided.

Hereinbefore, the invention has been described in detail, but the invention is not limited to the above-mentioned embodiment, and various modifications or changes may be made in a range without departing from the concept of the invention.

EXPLANATION OF REFERENCES

10: imaging control system
12: digital imaging device
14: operation control device
16: control information acquisition section
18: image analysis section
20: image evaluation section
22: operation controller
24: data transmitting/receiving section
26: voice registration section
28: voice recognition section
30: base/extension unit setting section
32: user registration section
34: user recognition section

What is claimed is:

1. An imaging control system that includes a plurality of digital imaging devices, and one or more operation control devices including a first processor that control operations of the plurality of digital imaging devices, wherein the first processor is configured to:

acquire operation control information including an evaluation item of an image and control content relating to an evaluation result with respect to the evaluation item of the image, in the one or more operation control devices;

analyze images captured by the plurality of digital imaging devices;

evaluate the image captured by each of the plurality of digital imaging devices with respect to the evaluation item, on the basis of an analysis result of the image; and control an operation of each of the digital imaging devices in accordance with control content relating to an evaluation result with respect to the evaluation item of the image captured by each of the plurality of digital imaging devices, wherein the evaluation item includes detection of a specific subject included in an image to be captured by each of the digital imaging devices, and the control content includes a method for handling the image including the specific subject, and the first processor performs subject detection for detecting the specific subject included in the image to be captured by each of the digital imaging devices, in each of the digital imaging devices, and performs a control so that in a case where the specific subject is included in the image to be captured by each of the digital imaging devices, a warning message indicating that the image in which the specific subject is taken should not be captured is displayed on a display included in each of the digital imaging devices, in each of the digital imaging devices.

2. The imaging control system according to claim 1, wherein
the control content includes at least one of image processing with respect to an image or a function control with respect to the digital imaging device.

3. The imaging control system according to claim 1, wherein the first processor
evaluates the image captured by each of the digital imaging devices with respect to the evaluation item and assigns a score to the image, and
performs a control so that an image of which the score of the evaluation result is smaller than a threshold value is transmitted from each of the digital imaging devices to the one or more operation control devices.

4. The imaging control system according to claim 1, wherein the first processor
transmits all the images captured by the plurality of digital imaging devices to the one or more operation control devices,
analyzes the images received from the plurality of digital imaging devices in the one or more operation control devices, and
evaluates the image received from each of the digital imaging devices with respect to the evaluation item, in the one or more operation control devices.

5. The imaging control system according to claim 1, wherein the first processor
performs subject detection for detecting a subject taken in an image, and
performs a control so that an image in which a subject that should not be publicly opened is taken and an image in which a subject that is not allowed to be taken cannot be used, irrelevant to the control content.

6. The imaging control system according to claim 1, wherein
the evaluation item includes detection of a specific person taken in an image, and the control content includes a method for handling the image in which the specific person is taken, and the first processor
performs person detection for detecting the specific person taken in the image, and
performs a control so that at least one of a process of preventing the image in which the specific person is taken from being taken out from a recording medium of the digital imaging device, a process of deleting the image in which the specific person is taken after displaying the image in which the specific person is taken on a display included in the digital imaging device, and a process of applying blurriness to a face of the specific person in a state where the image in which the specific person is taken is recorded on the recording medium, is performed.

7. The imaging control system according to claim 1, wherein the first processor evaluates the image captured by each of the digital imaging devices with respect to the evaluation item and assigns a score to the image, and performs a control so that an image of which the score of the evaluation result with respect to the evaluation item is smaller than a threshold value cannot be used in each of the digital imaging devices.

8. The imaging control system according to claim 1, wherein the first processor performs at least one of detection of a person's expression taken in an image, detection of a person's situation therein, or detection of a person's skin exposure level therein, assigns a score to the image so that the score of the image becomes lower in a case where the person's expression is a crying face compared with a case where the person's expression is a smiling face, the score of the image becomes lower in a case where the person's situation is surrounded by a plurality of persons compared with a case where the person's situation is one person, and the score of the image becomes lower in a case where the person's skin exposure level is equal to or larger than a threshold value compared with a case where the person's skin exposure level is smaller than the threshold value, and performs a control so that the image of which the score of the image is smaller than the threshold value cannot be used.

9. The imaging control system according to claim 1, wherein the first processor analyzes image position information, and performs a control so that an image taken at a photographing prohibited location cannot be used on the basis of the image position information.

10. The imaging control system according to claim 1, wherein the image is a motion picture, and the first processor recognizes a person's voice, and performs a control so that the motion picture cannot be used in a case where it is recognized that a word indicating that a person taken in the motion picture does not want to be imaged is included in the voice.

11. The imaging control system according to claim 1, wherein the specific subject is a specific person, and the first processor performs a control so that in a case where the specific person is included in an image to be captured by each of the digital imaging devices, a warning message indicating that an image in which the specific person is taken should not be captured is displayed in a face frame that surrounds a face of the specific person displayed on the display included in each of the digital imaging devices, in each of the digital imaging devices.

12. The imaging control system according to claim 1, wherein each of the digital imaging devices includes a second processor, and the second processor recognizes a person's voice, and the first processor performs a control so that in a case where it is recognized by the second processor that a word indicating that a person does not want to be imaged is included in the voice, a capturing of an image in each of the digital imaging devices is locked.

13. The imaging control system according to claim 1, wherein the first processor registers a person's voice, each of the digital imaging devices includes a second processor, and the second processor recognizes a person's voice, and the first processor performs a control so that in a case where a person's voice that matches a person's voice registered in the first processor is recognized by the second processor, a capturing of an image in each of the digital imaging devices can be performed or cannot be performed.

14. The imaging control system according to claim 1, wherein the first processor analyzes image position information and time information, and performs a control so that a capturing of an image in each of the digital imaging devices can be performed or cannot be performed on the basis of the position information and the time information, in each of the digital imaging devices.

15. The imaging control system according to claim 1, wherein the first processor analyzes image position information and time information, and performs a control so that a power source of each of the digital imaging devices is turned on or turned off on the basis of the position information and the time information, in each of the digital imaging devices.

16. The imaging control system according to claim 1, wherein the first processor sets the one or more operation control devices as base units, and sets the plurality of digital imaging devices as extension units, and performs a control so that an image can be captured only in a case where the extension units are allowed to perform imaging from the base units.

17. The imaging control system according to claim 1, wherein the first processor registers information on a plurality of users who respectively use the plurality of digital imaging devices;

authenticates each of the plurality of users on the basis of the information on the plurality of users, and performs a control so that an image can be captured only by a digital imaging device of the authenticated user.

18. An imaging control method in an imaging control system that includes a plurality of digital imaging devices and one or more operation control devices including a first processor that control operations of the plurality of digital imaging devices, wherein the first processor performs the steps of:

acquiring operation control information including control content relating to an evaluation item of an image and an evaluation result with respect to the evaluation item of the image, in the one or more operation control devices;

analyzing images captured by the plurality of digital imaging devices;

evaluating the image captured by each of the plurality of digital imaging devices with respect to the evaluation item, on the basis of an analysis result of the image; and controlling an operation of each of the digital imaging devices in accordance with control content relating to an evaluation result with respect to an evaluation item of the image captured by each of the plurality of digital imaging devices, the evaluation item includes detection of a specific subject included in an image to be captured by each of the digital imaging devices, and the control content includes a method for handling the image including the specific subject, and the first processor performs subject detection for detecting the specific subject included in the image to be captured by each of the digital imaging devices, in each of the digital imaging devices, and performs a control so that in a case where the specific subject is included in the image to be captured by each of the digital imaging devices, a warning message indicating that the image in which the specific subject is taken should not be captured is displayed on a display included in each of the digital imaging devices, in each of the digital imaging devices.

19. A non-transitory computer-readable recording medium having a program for causing a computer to execute the respective steps of the imaging control method according to claim 18 recorded thereon.

20. The imaging control system according to claim 1, wherein the control content includes a function control with respect to the digital imaging device, and the function control includes at least one of a control of permission or restriction of imaging using the digital imaging device and a control of power on/off of the digital imaging device.

\* \* \* \* \*